US012783763B2

(12) United States Patent
Fonseca et al.

(10) Patent No.: US 12,783,763 B2
(45) Date of Patent: Nov. 3, 2026

(54) SYSTEM AND METHOD FOR GLITCH DEBUGGING

(71) Applicant: Cadence Design Systems, Inc., San Jose, CA (US)

(72) Inventors: Matheus Nogueira Fonseca, Minas Gerais (BR); Lars Lundgren, Mölnlycke (SE); Gabriel Guedes de Azevedo Barbosa, Minas Gerais (BR); Paula Selegato Mathias, Minas Gerais (BR); Luis Humberto Rezende Barbosa, Minas Gerais (BR); Bárbara Leite Almeida, Minas Gerais (BR); Thamara Karen Cunha Andrade, Minas Gerais (BR); Gustavo Augusto Silva Junqueira, Minas Gerais (BR); João Paulo Magalhães de Melo dos Santos, Minas Gerais (BR)

(73) Assignee: Cadence Design Systems, Inc., San Jose, CA (US)

( * ) Notice: Subject to any disclaimer, the term of this patent is extended or adjusted under 35 U.S.C. 154(b) by 836 days.

(21) Appl. No.: 18/121,143

(22) Filed: Mar. 14, 2023

(65) Prior Publication Data

US 2024/0311538 A1 Sep. 19, 2024

(51) Int. Cl.

| | |
|---|---|
| ***G06F 30/327*** | (2020.01) |
| ***G06F 11/362*** | (2025.01) |
| ***G06F 30/331*** | (2020.01) |
| *G06F 119/12* | (2020.01) |

(52) U.S. Cl.
CPC ........ *G06F 30/327* (2020.01); *G06F 11/3652* (2013.01); *G06F 30/331* (2020.01); *G06F 2119/12* (2020.01)

(58) Field of Classification Search
CPC ...... G06F 30/33; G06F 30/331; G06F 30/327; G06F 30/3323; G06F 13/4291; G06F 9/4843; G06F 9/5027; G06F 2115/10; G06F 15/7864; G06F 21/445; G06F 2119/12; G06F 30/3312; G06F 11/24; G06F 11/3652; G06F 21/85
USPC .................................................. 716/100–106
See application file for complete search history.

(56) References Cited

U.S. PATENT DOCUMENTS 10,783,305 B1 * 9/2020 Fonseca .............. G06F 30/3323
10,885,248 B1 * 1/2021 Sotiropoulos ......... G06F 30/367
2014/0325463 A1 * 10/2014 Bahadra .............. G06F 30/3312 716/108

* cited by examiner

*Primary Examiner* — Binh C Tat
(74) *Attorney, Agent, or Firm* — Mark H. Whittenberger; Holland & Knight LLP

(57) ABSTRACT

Embodiments include herein are directed towards a system and method for glitch debugging in an electronic design. Embodiments may include receiving, using a processor, the electronic design and performing a formal glitch analysis of the electronic design to determine if one or more glitches are present in a clock logic of the electronic design. If a glitch is identified, embodiments may further include causing a generation of a graphical glitch debugger display. Embodiments may include receiving an edit to the electronic design and re-performing the formal glitch analysis of the electronic design to determine whether a glitch is present.

19 Claims, 12 Drawing Sheets

400

500

600

700

800

900

| f0 | f1early | f1 | Value | Symbol |
|---|---|---|---|---|
| 0 | 0 | 0 | Stable Low | |
| 0 | 1 | 1 | Posedge | |
| 0 | 1 | 0 | Low Glitch | |
| 0 | 0 | 1 | Late Posedge | |
| 1 | 0 | 0 | Negedge | |
| 1 | 1 | 1 | Stable High | |
| 1 | 1 | 0 | Late Negedge | |
| 1 | 0 | 1 | High Glitch | |

| Signal | f0 | f1early | f1 | Value | Symbol |
|---|---|---|---|---|---|
| system_clock | 0 | 1 | 1 | Posedge | |
| var | 1 | 1 | 0 | Late Negedge | |
| glitch clock | 0 | 1 | 0 | Low Glitch | |

1100

1200

SYSTEM AND METHOD FOR GLITCH DEBUGGING

FIELD OF THE INVENTION

The present disclosure relates to a system and method for use in electronic design, and more particularly, to a glitch debugging process.

BACKGROUND

Over the last 30 years, the complexity of integrated circuits has increased greatly. This increase in complexity has exacerbated the difficulty of verifying circuit designs. In a typical integrated circuit design process, which includes many steps, the verification step consumes approximately 70-80% of the total time and resources. Aspects of the circuit design such as time-to-market and profit margin greatly depend on the verification step. As a result, flaws in the design that are not found during the verification step can have significant economic impact by increasing time-to-market and reducing profit margins. To maximize profit, therefore, the techniques used for verification should be as efficient as possible.

As the complexity in circuit design has increased, there has been a corresponding improvement in various kinds of verification and debugging techniques. In fact, these verification and debugging techniques have evolved from relatively simple transistor circuit-level simulation (in the early 1970s) to logic gate-level simulation (in the late 1980s) to the current art that uses Register Transfer Language (RTL)-level simulation. RTL describes the registers of a computer or digital electronic system and the way in which data are transferred among the combinational logic between registers.

Existing verification and debugging tools are used in the design flow of a circuit. The design flow begins with the creation of a circuit design at the RTL level using RTL source code. The RTL source code is specified according to a Hardware Description Language (HDL), such as Verilog HDL or VHDL. Circuit designers use high-level hardware description languages because of the size and complexity of modern integrated circuits. Circuit designs are developed in a high-level language using computer-implemented software applications, which enable a user to use text-editing and graphical tools to create a HDL-based design.

An increasingly popular technique is to use formal methods to verify the properties of a design completely. Formal methods use mathematical techniques to prove that a design property is either always true or to provide an example condition (called a counterexample) that demonstrates the property is false. Tools that use formal methods to verify RTL source code and design properties are known as "model checkers." Design properties to be verified include specifications and/or requirements that must be satisfied by the circuit design. Since mathematical properties define the design requirements in pure mathematical terms, this enables analysis of all possible valid input sequences for a given circuit and is akin to an exhaustive simulation. Formal verification methods are therefore exhaustive, when compared for example to simulation methods, and they may provide many benefits, such as reduced validation time, quicker time-to-market, reduced costs, and high reliability.

Formal verification involves heavy mathematical computation, and traditional formal verification tools place a heavy emphasis on automation. Therefore, users typically let their formal verification tools run in a batch mode instead of interactively, frequently waiting overnight for the complex analysis to finish. But the lack of interactivity leaves the designer's insights into the design out of the process, ultimately making the formal verification less effective.

In existing approaches users run the formal proof to get a list of failed properties. The proof engines can provide the counter example to the user in order to debug the failures in an electronic design automation environment. The user may apply constraints on the current waveform to create a new alternate waveform. If the new waveform fails some existing properties, the user may debug these failures.

In the context of formal verification, glitches are unstable values generated by unstable combinational loops in the clock, which violate synchronous design principles and can cause unreliability in digital designs. Glitches are not handled in the formal model concept and can lead to errors in the proof flow, like an interruption, or even wrong proof results. Glitches usually are created by a designer's mistake and are difficult to see on RTL. Therefore, it is of interest of formal users to be able to detect and fix such bugs.

SUMMARY

In one or more embodiments of the present disclosure, a method for glitch debugging in an electronic design is provided. The method may include receiving, using a processor, the electronic design and performing a formal glitch analysis of the electronic design to determine if one or more glitches are present in a clock logic of the electronic design. If a glitch is identified, the method may further include causing a generation of a graphical glitch debugger display. The method may include receiving an edit to the electronic design and re-performing the formal glitch analysis of the electronic design to determine whether a glitch is present.

One or more of the following features may be included. In some embodiments, causing the generation of the graphical glitch debugger display may include automatically generating one or more labels, colors, or icons at the display. Causing the generation of the graphical glitch debugger may also include displaying a gate diagram showing a glitch path and/or displaying a cycle by cycle waveform. The formal glitch analysis may include an 8-value formal verification analysis on a target group of combinational loops. A different color may be used to highlight a number of different logic elements associated with a glitch path. The number of different logic elements may include one or more of glitch, late edge, and main gate.

In one or more embodiments of the present disclosure, a computer-readable storage medium having instructions for estimating glitch power associated with an emulation process is provided. Some operations may include receiving, using a processor, the electronic design and performing a formal glitch analysis of the electronic design to determine if one or more glitches are present in a clock logic of the electronic design. If a glitch is identified, operations may include causing a generation of a graphical glitch debugger display, wherein causing a generation of a graphical glitch debugger display includes a gate diagram showing a glitch path corresponding to the identified glitch.

One or more of the following features may be included. In some embodiments, causing the generation of the graphical glitch debugger display may include automatically generating one or more labels, colors, or icons at the display. Operations may further include receiving an edit to the electronic design and re-performing the formal glitch analysis of the electronic design to determine whether a glitch is present. Causing the generation of the graphical glitch debugger may include displaying a cycle by cycle waveform. The formal glitch analysis may include an 8-value formal verification analysis on a target group of combinational loops. A different color may be used to highlight a number of different logic elements associated with a glitch path. The number of different logic elements may include one or more of glitch, late edge, and main gate.

In one or more embodiments of the present disclosure, a system for glitch debugging in an electronic design is provided. The system may include a graphical user interface and at least one processor configured to receive, using a processor, the electronic design. The at least one processor may be further configured to perform a formal glitch analysis of the electronic design to determine if one or more glitches are present in a clock logic of the electronic design. If a glitch is identified, the at least one processor may be further configured to cause a generation of a graphical glitch debugger display via the graphical user interface. The at least one processor may be further configured to receive an edit to the electronic design at the graphical user interface, wherein the at least one processor is further configured to re-perform the formal glitch analysis of the electronic design to determine whether a glitch is present.

One or more of the following features may be included. In some embodiments, causing the generation of the graphical glitch debugger display may include automatically generating one or more labels, colors, or icons at the display. The at least one processor may be further configured to receive an edit to the electronic design and re-performing the formal glitch analysis of the electronic design to determine whether a glitch is present. Causing the generation of the graphical glitch debugger may include displaying a cycle by cycle waveform. The formal glitch analysis may include an 8-value formal verification analysis on a target group of combinational loops. A different color may be used to highlight a number of different logic elements associated with a glitch path.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

DETAILED DESCRIPTION

Figure 1:
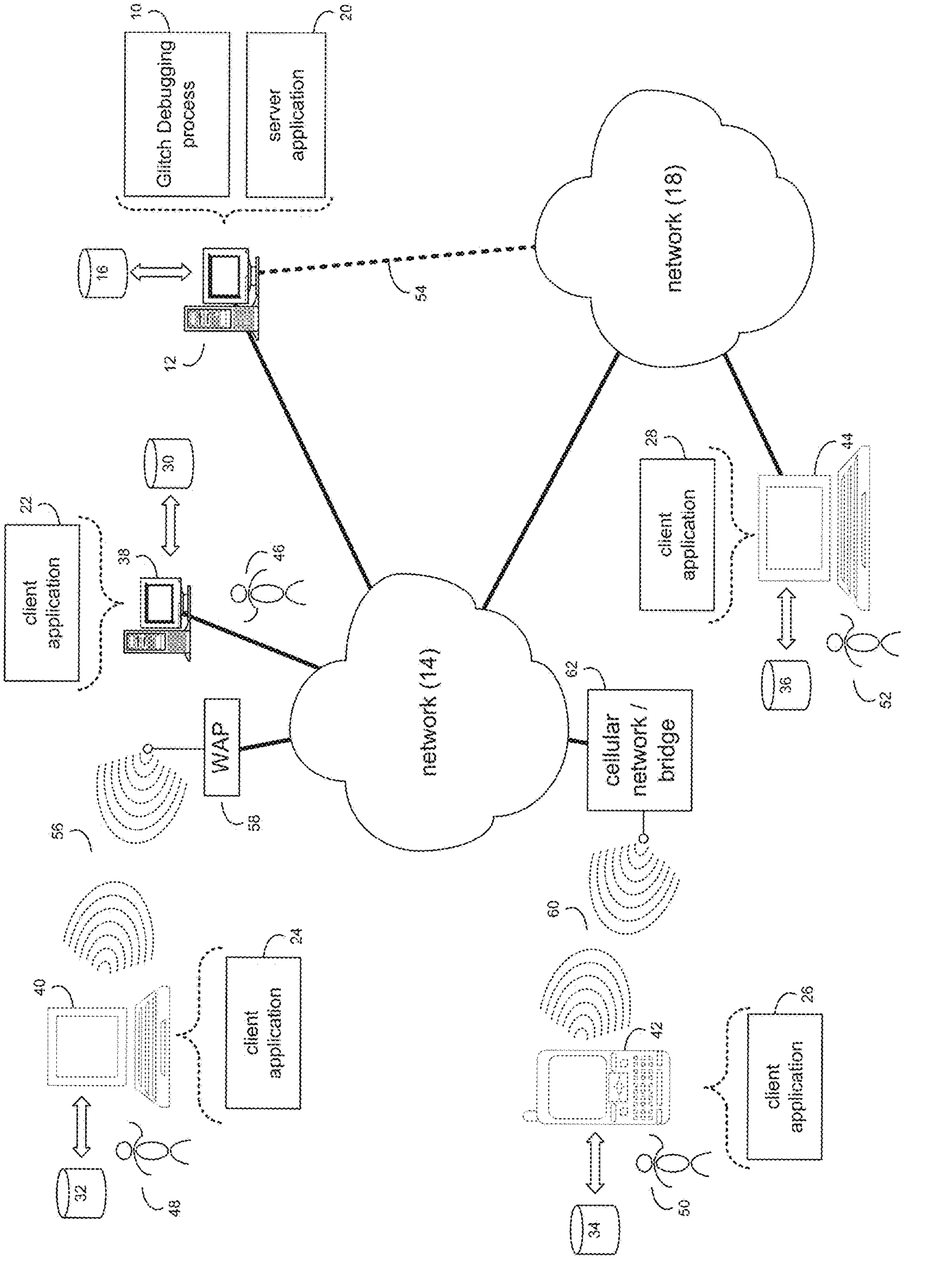
FIG. 1 diagrammatically depicts a glitch debugging process coupled to a distributed computing network.

Reference will now be made in detail to the embodiments of the present disclosure, examples of which are illustrated in the accompanying drawings. The present disclosure may, however, be embodied in many different forms and should not be construed as being limited to the embodiments set forth herein; rather, these embodiments are provided so that this disclosure will be thorough and complete, and will fully convey the concept of the present disclosure to those skilled in the art. In the drawings, the thicknesses of layers and regions may be exaggerated for clarity. Like reference numerals in the drawings may denote like elements.

Referring to FIG. 1, there is shown a glitch debugging process 10 that may reside on and may be executed by server computer 12, which may be connected to network 14 (e.g., the internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft Windows XP Server™; Novell Netware™, or Redhat Linux™, for example. Additionally and/or alternatively, glitch debugging process 10 may reside on a client electronic device, such as a personal computer, notebook computer, personal digital assistant, or the like.

The instruction sets and subroutines of glitch debugging process 10, which may be stored on storage device 16 coupled to server computer 12, may be executed by one or more processors (not shown) and one or more memory architectures (not shown) incorporated into server computer 12. Storage device 16 may include but is not limited to: a hard disk drive; a tape drive; an optical drive; a RAID array; a random access memory (RAM); and a read-only memory (ROM).

Server computer 12 may execute a web server application, examples of which may include but are not limited to: Microsoft IIS™, Novell Webserver™, or Apache Webserver™, that allows for HTTP (i.e., HyperText Transfer Protocol) access to server computer 12 via network 14. Network 14 may be connected to one or more secondary networks (e.g., network 18), examples of which may include but are not limited to: a local area network; a wide area network; or an intranet, for example.

Server computer 12 may execute one or more server applications (e.g., server application 20), examples of which may include but are not limited to, e.g., Microsoft Exchange™ Server. Server application 20 may interact with one or more client applications (e.g., client applications 22, 24, 26, 28) in order to execute glitch debugging process 10. Examples of client applications 22, 24, 26, 28 may include, but are not limited to, design verification tools such as those available from the assignee of the present disclosure. These applications may also be executed by server computer 12. In some embodiments, glitch debugging process 10 may be a stand-alone application that interfaces with server application 20 or may be an applet/application that is executed within server application 20.

The instruction sets and subroutines of server application 20, which may be stored on storage device 16 coupled to server computer 12, may be executed by one or more processors (not shown) and one or more memory architectures (not shown) incorporated into server computer 12.

As mentioned above, in addition/as an alternative to being a server-based application residing on server computer 12, the glitch debugging process may be a client-side application (not shown) residing on one or more client electronic devices 38, 40, 42, 44 (e.g., stored on storage devices 30, 32, 34, 36, respectively). As such, the glitch debugging process may be a stand-alone application that interfaces with a client application (e.g., client applications 22, 24, 26, 28), or may be an applet/application that is executed within a client application. As such, the glitch debugging process may be a client-side process, a server-side process, or a hybrid client-side/server-side process, which may be executed, in whole or in part, by server computer 12, or one or more of client electronic devices 38, 40, 42, 44.

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID arrays; random access memories (RAM); read-only memories (ROM), compact flash (CF) storage devices, secure digital (SD) storage devices, and memory stick storage devices. Examples of client electronic devices 38, 40, 42, 44 may include, but are not limited to, personal computer 38, laptop computer 40, personal digital assistant 42, notebook computer 44, a data-enabled, cellular telephone (not shown), and a dedicated network device (not shown), for example.

Users 46, 48, 50, 52 may access server application 20 directly through the device on which the client application (e.g., client applications 22, 24, 26, 28) is executed, namely client electronic devices 38, 40, 42, 44, for example. Users 46, 48, 50, 52 may access server application 20 directly through network 14 or through secondary network 18. Further, server computer 12 (e.g., the computer that executes server application 20) may be connected to network 14 through secondary network 18, as illustrated with phantom link line 54.

In some embodiments, glitch debugging process 10 may be a cloud-based process as any or all of the operations described herein may occur, in whole, or in part, in the cloud or as part of a cloud-based system. The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (CSMA/CA) for path sharing. The various 802.11x specifications may use phase-shift keying (PSK) modulation or complementary code keying (CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows™, Microsoft Windows CE™, Redhat Linux™, Apple IOS, ANDROID, or a custom operating system.

Figure 2:
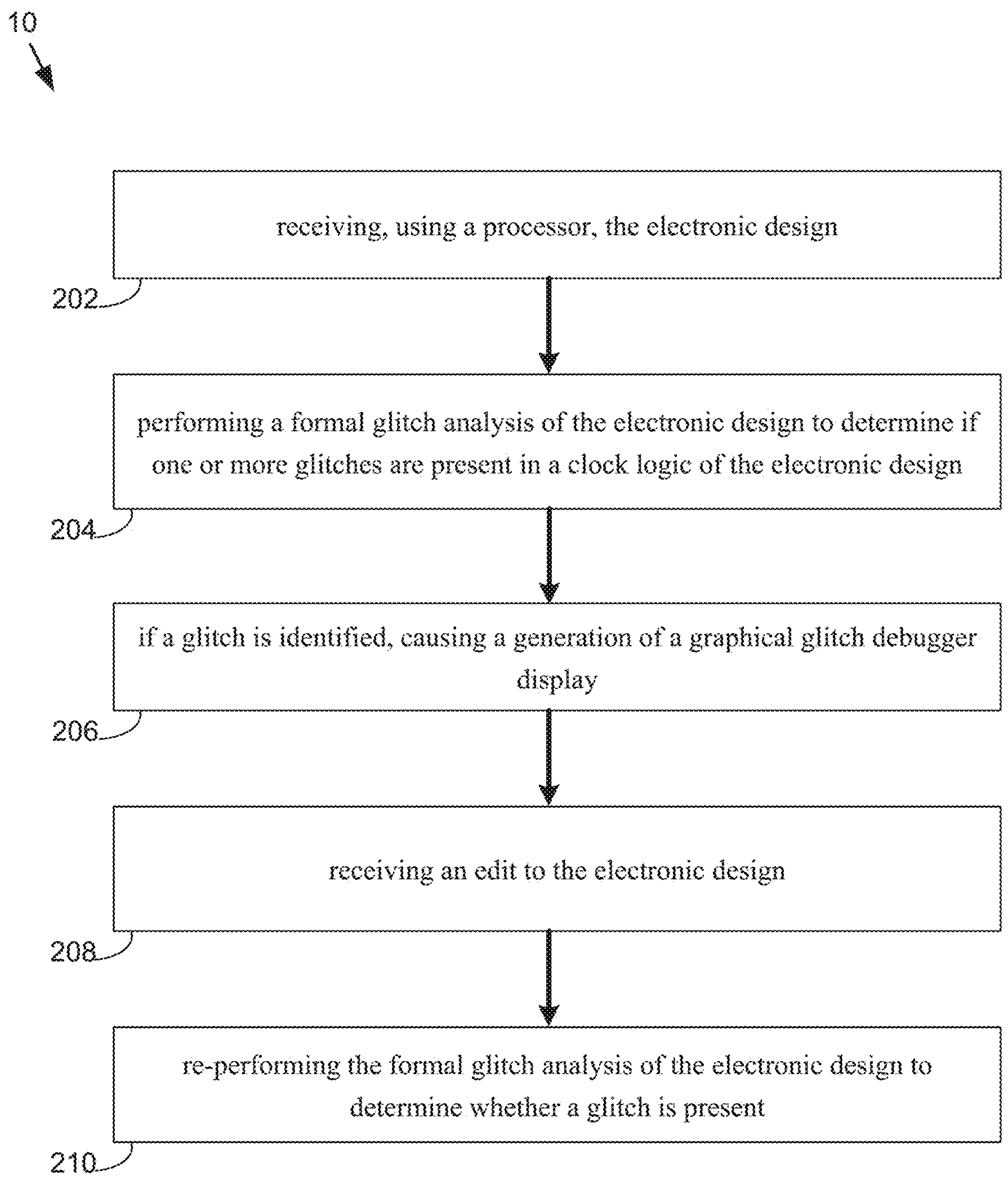
FIG. 2 is an exemplary flowchart of a glitch debugging process according to an embodiment of the present disclosure.

Referring now to FIG. 2, a flowchart depicting an embodiment consistent with glitch debugging process 10 is provided. The method may include receiving (202), using a processor, the electronic design and performing (204) a formal glitch analysis of the electronic design to determine if one or more glitches are present in a clock logic of the electronic design. If a glitch is identified, the method may further include causing (206) a generation of a graphical glitch debugger display. The method may include receiving (208) an edit to the electronic design and re-performing (210) the formal glitch analysis of the electronic design to determine whether a glitch is present. Numerous other operations are also within the scope of the present disclosure.

Embodiments of the glitch debugging process described herein may work in conjunction with server application 20, which may include an electronic design automation application such as those available from the Assignee of the subject disclosure. Some of these may include, but are not limited to, the Cadence® Jasper™ RTL suite of applications (e.g., Jasper Visualize™ Interactive Debug Environment incorporating the QuietTrace™ debugging capability).

Figure 3:
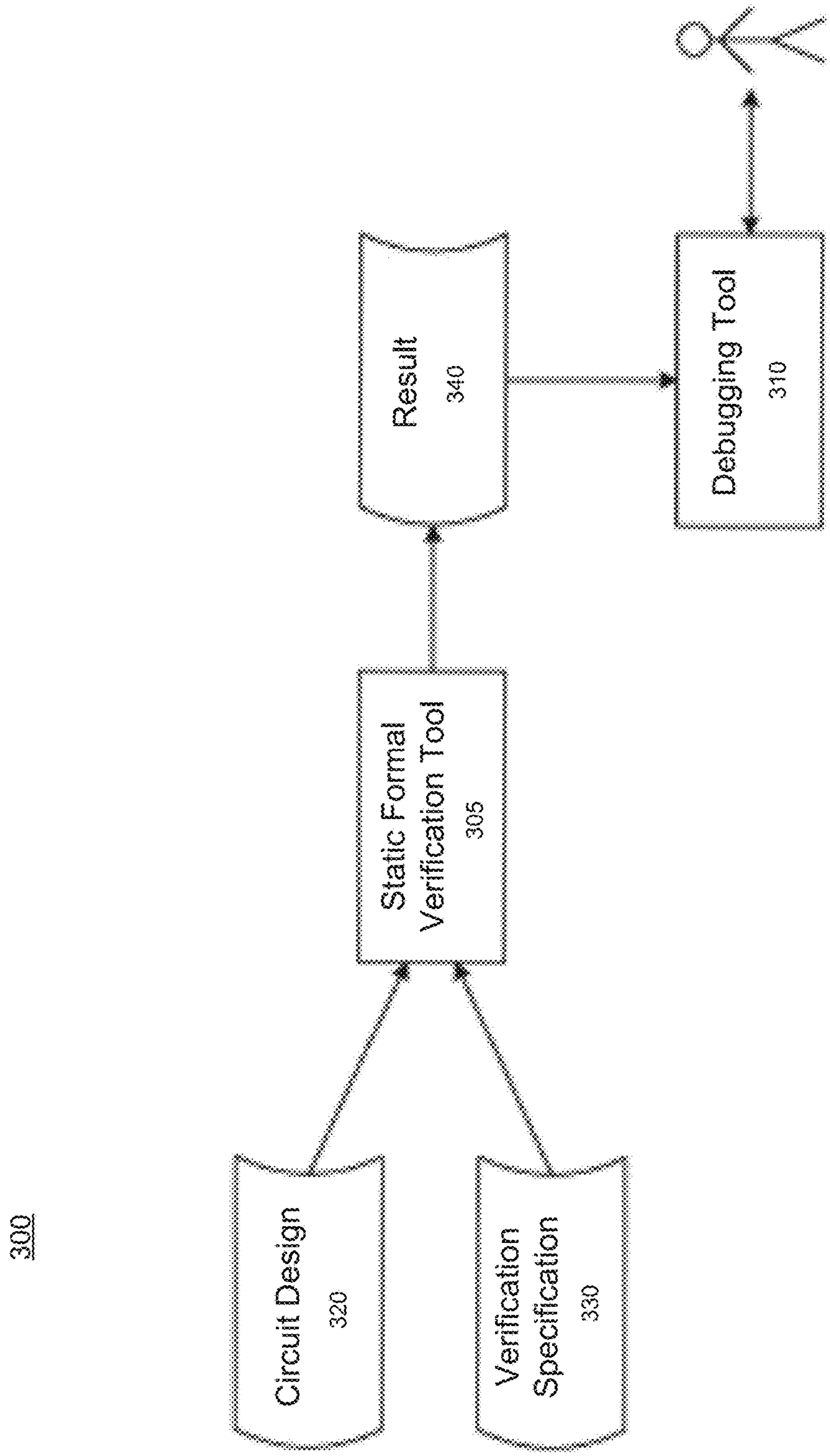
FIG. 3 is a diagram showing an example of a glitch debugging process according to an embodiment of the present disclosure.

Referring also to FIG. 3, an embodiment of a methodology for formal verification of a circuit design 320 is provided. The circuit design 320 may be embodied in a data file encoded using a hardware description language (HDL), which may describe the structural design and operation of a circuit. A set of requirements may be derived from a design specification for the circuit and then used to test whether the circuit design is compliant with the design specification. A user, such as a circuit designer or a verification engineer, may supply the requirements for the circuit design. The requirements may be encoded in a verification specification 330 as one or more properties and/or assumptions for the circuit design 320, encoded for example using Property Specification Language (PSL) or System Verilog Assertion (SVA). The verification specification 330 may be directly coded by a user or captured in an automated process. A property may be represented in the verification specification 330 as an assertion, where the assertion is satisfied if the property is true for all operating conditions of the circuit design 320. A property may also be represented in the verification specification 330 as a cover, where the cover is satisfied if the property is true for some operating condition of the circuit design 320. An assumption specifies that certain input signals to the circuit design may only take on pre-determined values (i.e., 0 or 1) at certain clock cycles when testing the circuit design against the property.

In a formal verification process, the verification tool 305 may receive a circuit design 320 and a verification specification 330 for testing the circuit design 320 against a set of requirements. The circuit design 320 and verification specification 330 may be represented in one or more files containing HDL code, which define a digital design and/or properties that give a functional specification of the design. The verification tool 305 may convert the inputs (i.e., the circuit design 320 and verification specification 330) into an internal representation using one or more data structures, such as a netlist. This conversion may comprise two different conversions: (1) synthesis of the input circuit design 320, and (2) property compilation of the properties in the verification specification 330.

The results of the design synthesis and the property compilation may then be combined into a common problem instance that is given as input to a model checker in the verification tool 305. The verification tool 305 then performs formal verification on the circuit design 320 using the statically allocated data structure. For assertions, during the formal verification process, the model checker attempts to determine whether there is a possible behavior of the circuit design 320 where one of the properties in the verification specification 330 are not true, which is called a counterexample for the property. If it is determined that no counterexample exists for a property, the property is said to be proven. The results 340 of the formal verification process thus comprise an indication of whether one or more of the properties are satisfied, and if not, the counterexample showing a condition under which the property fails. The counterexample includes a sequence of values for signals (input, internal, or output) of the circuit design over a number of clock cycles that satisfy the given assumptions but result in the property failure.

The verification of a cover may proceed in a similar way. In one embodiment, for a cover, the verification tool attempts to determine whether there is a possible behavior of the circuit design that satisfies the cover, which is called a cover trace. This cover trace includes a sequence of values for signals of the circuit design over a number of clock cycles that satisfy the given assumption and satisfy the cover.

The verification tool 305 outputs the result 330 of the verification process, which may be stored in memory, passed along to another software process, or displayed to the user. The result may comprise a counterexample if the circuit design 320 fails to meet the properties encoded in the verification specification or a witness if the design 320 satisfies the properties (e.g., the witness can be a cover trace). A debugging tool 310 may also be included to display the counterexample or witness to a circuit designer in a useful way to the designer. In one embodiment, the debugging tool 310 accepts the circuit design 320, verification specification 330, and result 340 as inputs and applies one or more soft constraints to the result 340 to create a quieter trace. This can facilitate understanding of what aspect of the HDL code in the circuit design 320 is responsible for the counterexample to the property in question. The debugging tool 310 may include a viewer as well as editing software.

Embodiments of the present disclosure provide a debugging tool 310 that helps the circuit designer understand counterexamples that are identified during a formal verification process, and thereby more easily debug the circuit design when counterexamples are found. In some embodiments, glitch debugging process 10 may provide for a more user friendly display that helps the designer quickly debug electronic designs far faster than by using conventional approaches.

The debugging tool 310 also enables the user to jump between the traces in the sequence to compare differences between the traces. For example, the debugging tool 310 receives a user input selecting a trace for display. In response, the debugging tool 310 displays a waveform of the selected trace to the user. This enables the circuit designer to visualize how the trace changes on an incremental basis as new constraints are applied to the trace, which facilitates the process of debugging a circuit design. Additional information regarding formal verification techniques, including quiet trace approaches, may be found in U.S. Pat. Nos. 7,506,288, 8,863,049, and 10,635,768, which are each incorporated herein by reference in their entirety.

As discussed above, in the context of formal verification, glitches are unstable values generated by unstable combinational loops in the clock, which violate synchronous design principles and can cause unreliability in digital designs. Glitches are not handled in the formal model concept and can lead to errors in the proof flow, like an interruption, or even wrong proof results. Glitches usually are created by a designer's mistake and are difficult to see on RTL. Therefore, it is of interest to formal users to be able to detect and fix such bugs.

In a 0-delay model, a glitch may be caused by the output pin of a flip-flop that affects the value of its own clock pin, which is a functional combinational loop. In a 0-delay model, that generally abstracts away all propagation delays many types of glitches may be abstracted away, but a glitch may still be caused by the output pin of a flip-flop that affects the value of its own clock pin, which is a functional combinational loop. When debugging the existence and impact of combinational loops in an electronic design, the user often faces situations with many courses of action and it is common for them to be confused about what decision to take next, especially if it is an uncommon flow or use case, or a beginner user in the verification area.

Figure 4:
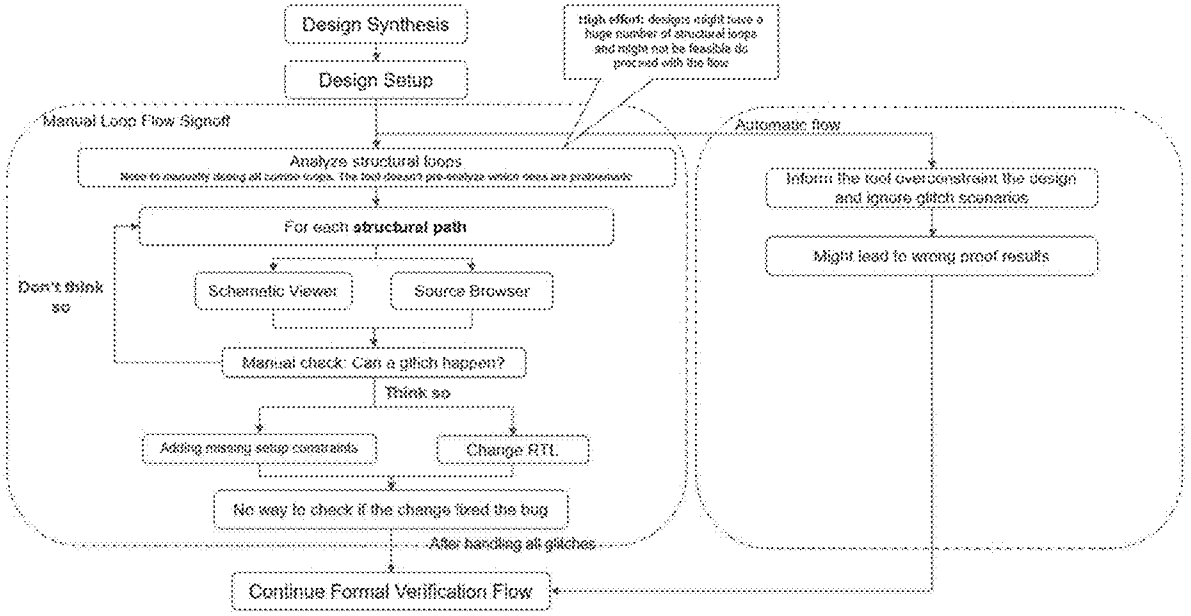
FIGS. 4-5 are additional exemplary flowcharts of a glitch debugging process according to embodiments of the present disclosure.

Referring now to FIG. 4, in existing systems, formal verification tools only inform the user that structural combinational loops exist in the electronic design. Structural loops are common, and some designs may have an astronomical number of them, most of which are harmless and only a few may actually lead to real problems. Therefore, the user often struggles to identify if any combinational loop is harmful and could cause formal glitches. Then, the user relies on a generic solution that assumes that the design doesn't have formal glitches to unblock the formal verification flow.

The conventional approach burdens the user to find the rare paths that may be functional in an excessively large set of structural loops, most of which cannot be functional. Once a path is found, the user must understand in detail how it is functional, and what can be done to change that, aided only by two-valued values on the nets. A two-valued value indicates that although the momentary values of the nets are available their causal role (if any) in the glitch formation chain is not. Two-valued values cannot represent glitches and late edges. In particular, only having access to two-valued values means the burden is on the user to correctly navigate the combinatorial cloud constituting the structural feedback from the flop output to its clock pin-intuiting the relevant fanins/fanouts to follow. The conventional approach above is a task so complex and the effort is so high that the user in most cases just adds a configuration command that assumes that there is no glitch in the design. If the assumption is wrong, it will lead to incorrect proof results.

Figure 5:
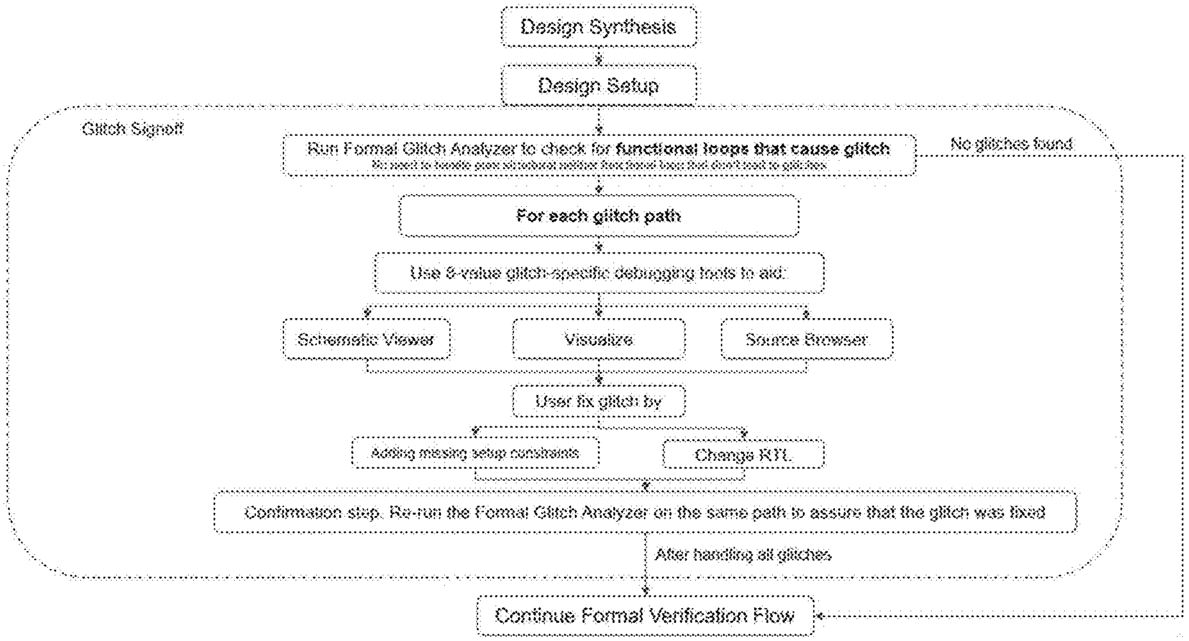

Referring now to FIG. 5, a diagram 500 showing operations consistent with embodiments of glitch debugging process 10 is provided. More specifically, Diagram 500 displays an example of a formal glitch analyzer consistent with glitch debugging process 10. Embodiments included herein propose an interactive signoff flow that detects glitches in the clock logic of the electronic design and guides the user on fixing them, gaining confidence in the design behavior and formal verification results by formally proving the absence of glitches, and saving expert engineering time. Each of the operations depicted in FIG. 5 is discussed in further detail hereinbelow.

Embodiments of glitch debugging process 10 included herein propose an interactive scalable glitch signoff approach that guides the user to a design having glitch-free clock logic. In operation, the user may access glitch debugging process 10 using one or more EDA applications 20 and run the formal glitch analyzer. This service runs a formal proof that checks if the design has glitches in the clock logic. If no counterexample is found, there is no harmful combinational loop in the design, and the user may proceed with their formal verification flow. If the formal engine finds a counterexample for the scenario before, it means that the electronic design has glitches, and the user needs to debug the combinational loops and fix the glitch sources. To guide the user in debugging the glitches, glitch debugging process 10 may show an exact functional scenario that a glitch is happening. The user may choose between one or more of the debugging services that they are familiar with. Those services were improved to show an 8-value logic of the combinational loop path, showing how each signal in the glitch path is behaving. The formal glitch analyzer may run an 8-value formal verification analysis on a target group of combinational loops and verify whether there is any scenario that leads to a glitch in any of the target loops.

Figure 6:
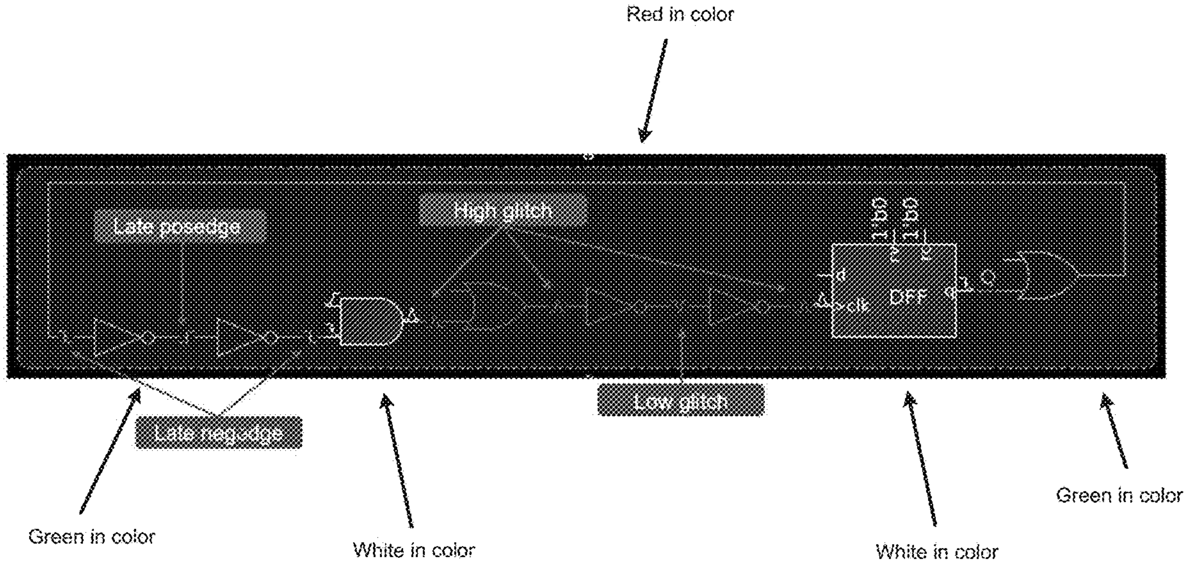
FIGS. 6-7 show example graphical user interfaces according to embodiments of the present disclosure.

Referring now to FIG. 6, a graphical user interface 600 showing a gate diagram within a schematic viewer is provided. Accordingly, glitch debugging process 10 may allow the user to utilize the schematic viewer to understand the source of glitches as well as their impact. In operation, when opening the schematic tool, only the relevant logic related to the glitch may be displayed, allowing the user to focus on that loop. The logic may be highlighted at graphical user interface 500 using different colors and/or annotations to indicate various concepts.

For example, glitch debugging process 10 may automatically identify components and generate the colors and annotations as shown at GUI 600. In this particular example, the main components are displayed in white (e.g., the DFF and AND gate). The late posedge and late negedge components are displayed in green and the high glitch and low glitch components are displayed in red. The values for each net may also be displayed, considering the 8-value logic mentioned before. It should be noted that the particular colors and annotation discussed herein are provided merely by way of example as numerous combinatinos of colors and annotations may be employed without departing from the scope of the present disclosure.

In some embodiments, the schematic viewer may be configured to focus on the functional logic that caused the loop, in a very linear way, highlighting the loop itself, without unnecessary branching and extra logic. This allows the user to better understand how the glitch is formed, providing a far more straightforward debugging experience. This significantly reduces the effort necessary to understand and debug the cause of the glitch.

In some embodiments, on top of the functional loop displayed, the schematic viewer may highlight specific logic based on one or more categories. Some of these may include, but are not limited to, glitch, late edge, main gate, etc. For example, glitch highlighting may include coloring one or more nets and/or gates through which the glitch has propagated with a distinctive color and annotating the nets with a symbol representing the glitch polarity (e.g., a high-glitch, low-glitch, etc.). Similarly, to the glitch highlighting, the late edge highlighting colors nets and/or gates that propagate the late edge signal with a distinctive unique color, and the nets may receive annotation relative to the late edge polarity, being it a late positive edge or a late negative edge. The main gate highlighting emphasizes the two main gates within the loop, giving them a third color and showing each of its pins' values in the schematic. These three parts provide the user with a powerful and immediate vision of the behavior of the loop. By seeing the main gates, the user discovers where the glitch is being formed, the glitch and late edge highlighting display how each gate is being affected. At this point the user has all of the necessary tools to evaluate what would be the best way to remove the glitch from the design.

In some embodiments, glitch debugging process 10 may allow the user to expand the schematic outside of the loop to better situate where the loop exists within the design, while the highlighting remains as a visual aid for the user to quickly focus back to where the glitch is occurring. GUI 600 shows how this information is useful for the user as he or she may see quickly why the glitch is happening. The glitch source (and gate) has in its input a positive edge and a late negative edge which generates a high glitch that may propagate until the glitch clock pin of the glitch flop.

In some embodiments, glitch debugging process 10 may allow the user to debug the glitch in conjunction with server application 20, thus analyzing one or more values for the signals in the waveform. The user may make use of all the existing features associated with EDA application 20 (e.g., Why/Because, source code browser integration, what-if analysis, etc. associated with the Jasper Visualize™ Interactive Debug Environment) to further investigate and understand the reason for a glitch. Users may also count with all annotations that were described in the previous schematic viewer section but in a Visualize context. In some embodiments, these annotations may be related to the values and interpretation of nets/gates in the waveform viewer (similar to the annotations and values on the schematic). It may include annotations for values such as glitch polarity, late edges, etc. The schematic viewer associated with glitch debugging process 10 and various other EDA applications 20 may be used together, while the first focuses on showing the design structure and the behavior of the design in the cycle that the glitch happened, the others may help the user to understand what was necessary to make the design get into the glitch state.

In the specific example shown in FIG. 6, the schematic viewer displays a gate diagram with the glitch path and annotations with the 8-value logic of each signal. As discussed above, in some embodiments, glitch debugging process 10 may be configured to display within the schematic viewer only the functional glitch path. This may include the 8-value logic in each signal in the glitch path in the cycle that the glitch happens.

Figure 7:
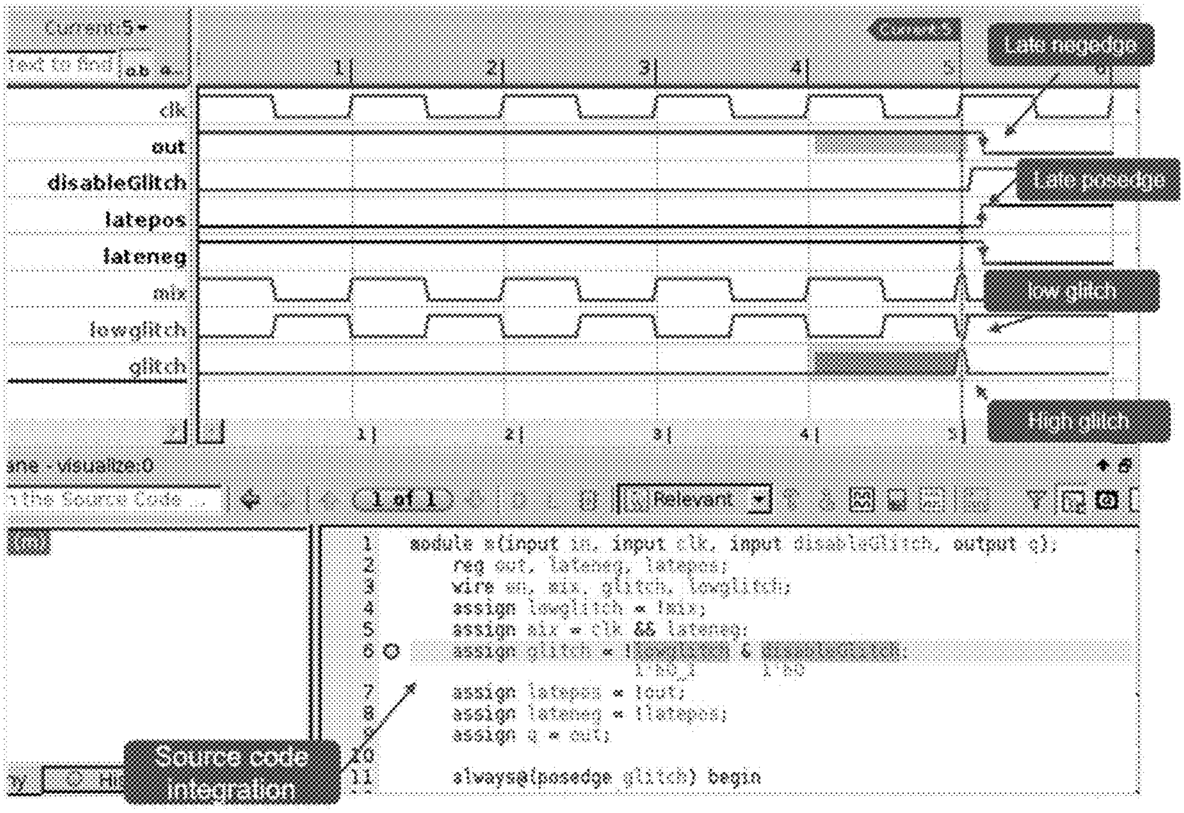

Referring now to FIG. 7, a diagram showing a graphical user interface 700 consistent with embodiments of glitch debugging process 10 is provided. GUI 700 displays a cycle-by-cycle waveform informing one or more states that the design needs to reach to generate the glitch. More particularly, GUI 700 may be configured to display a functional scenario that leads to a glitch in cycle N. Accordingly, glitch debugging process 10 may display and/or highlight the 8-value glitch logic in the cycle that it happened. In this way, the user may be able to debug and understand what led the design to make the glitch functional. After the user understands the root cause of the glitch, they can proceed with fixing the RTL or adding any missing constraint in the setup.

In some embodiments, glitch debugging process 10 may provide a confirmation step option, so that the user may re-run the formal glitch analyzer in a specific path to check if the glitch has been fully addressed. In some cases, it is possible that the user's modification was not entirely successful, and the glitch may still occur in another state. The formal glitch analyzer associated with glitch debugging process 10 may detect such a case and show a new trace/schematic to the user reducing the turnaround time. Once the user has addressed all sources of glitches, they may continue their formal verification flow with the guarantee that there are no bugs related to glitches in the design.

Figure 8:
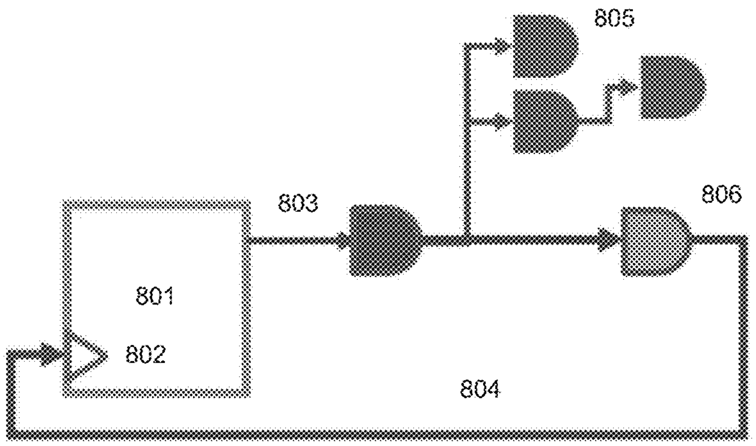
FIG. 8 is a diagram showing an example of a circuit according to an embodiment of the present disclosure.

Referring now to FIG. 8, an example circuit 800 and a number of associated components and definitions are provided. Circuit 800 includes glitch flop 801, which is a D flip-flop gate that contains a glitch. Glitch clock 802 corresponds to the glitch flop's clock input, which may be the net in which the glitch will occur. Glitch variable 803 may correspond to a variable clocked by a glitch clock. Glitch propagation path 804 is a path in which a value may propagate from a glitch var (late edge) to its clock (glitch). "Late Vars" 805 may correspond to one or more asynchronous variables that the glitch loop may influence. A synchronous element may break the path. Glitch source 806 may correspond to the gate that caused the glitch.

Figure 9:
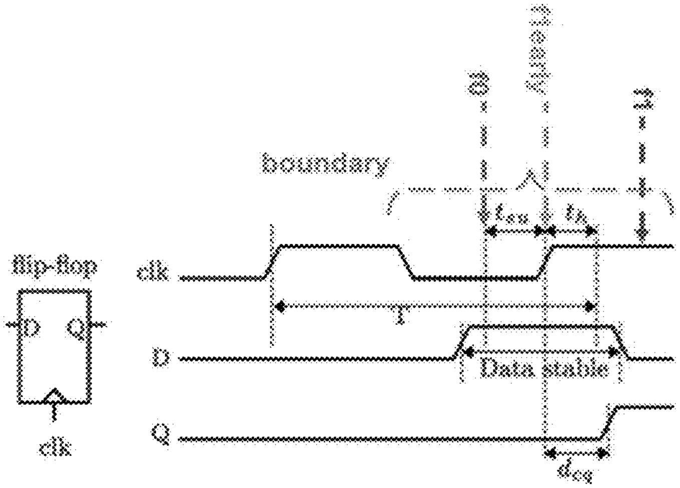
FIG. 9 is a diagram showing an example depicting a table showing 8-valued logic and a timing diagram showing elements of a glitch loop according to an embodiment of the present disclosure.

In some embodiments, and as discussed above, a formal glitch analyzer may be used as part of glitch debugging process as is shown in FIG. 9. In some embodiments, in order to make it possible to obtain a 2-value design and convert it to an 8-value logic, glitch debugging process 10 may insert an abstraction into one or more flops as further described in FIG. 9. This abstraction may be inserted on all flops that are present in the combinational loop group. The 2-value logic may be converted to the 8-value logic based on the interpretation of the table for each signal that is described FIG. 9. The formal engines associated with the EDA application of server application 20 may be configured to verify if any 8-value abstracted flop has any glitch-value (e.g., low-glitch or high-glitch). If glitch debugging process 10 identifies any functional path that generates a glitch, it may issus an error and inform the user that he or she needs to continue with the glitch signoff. This flop abstraction may not change design behavior, it is a mechanism created to enable cycle-based formal engines to detect non-cycle-based value changes. Accordingly, the results produced by the formal glitch analyzer will not generate incorrect proof results. In this way, the user will not waste time debugging false glitches, and if the formal glitch analyzer doesn't find a scenario, it means that no glitch exists in the design.

In some embodiments, the formal glitch analyzer may also be used as a confirmation step. In operation, after the user makes any RTL/setup change with the intention to fix the glitch, he or she may rerun the formal glitch analyzer in the exact path that they were debugging, and the 8-value flop abstraction may be placed only in the flops in the path of the specified combo loops. If the formal glitch analyzer can detect a glitch scenario, it means that the changes were wrong and/or not sufficient to fix the issue. If the change was wrong, he or she may be able to immediately visualize a scenario in which the glitch is happening and may decide to undo the change or continue improving it to fix all glitch scenarios. This step is important to avoid unnecessary changes and saves time by enabling the user to focus on one loop until it is fixed, without any context change.

Referring again to FIGS. 9-12 an example consistent with embodiments of glitch debugging process 10 is provided. FIG. 9 displays an example table showing 8-value logic and a timing diagram showing elements of a glitch loop. For the glitch simulation, glitch debugging process 10 may start from a trace and perform a differential analysis, in this particular example focusing on three values: "f0", "f1" and "f1_early". The "f0" value may be defined as the value in the first step of the cycle boundary. Value "f1" corresponds to those in the second step of the cycle boundary. Both values come from a regular trace simulation. Value "f1_early" is a speculative simulation, where the glitch variables are assigned with late values. This can be seen as a what-if analysis of what would happen if this variable held for an excessive period of time. Using such values, as per the table in FIG. 9, it may be possible to determine the value of the glitch. More specifically, the table in FIG. 9 defines exemplary 8-value logic that may be used in formal verification and in simulation to detect and show to the user how and why the glitch is formed. In this example, "system_clock" may correspond to a component of the system in which all clocks are synced to and the "boundary" is the cycle in which the glitch occurs. "f0" corresponds to the value right before posedge system_clock. "f1early" corresponds to the value after posedge of system_clock, all variables updated except glitch and late vars. This may extend the 0-delay model simulation by introducing a delta-cycle (d_cq effect). "f1" corresponds to the value after posedge of system_clock, with all new values propagated.

In some embodiments, and referring again to FIG. 5, glitch debugging process 10 may be configured to synthesize one or more formal loop properties. Accordingly, embodiments included herein may detect structural and/or possibly functional loops through clock pins (e.g. see the glitch signoff operations in FIG. 5). In operation, this may include adding a delta cycle for clocking signal "gclk". Here, "$gclk_{f0}$" may correspond to immediately before posedge system_clock. "$gclk_{f1\_early}$" may correspond to after posedge (e.g., all flops and inputs update except those clocked by gclk). "$gclk_{f1}$" may correspond to after posedge (e.g., all flops and inputs updated.

A sampling condition when there are no loops is given by:

$$\overline{gclk_{f0}} \wedge gclk_{f1} \quad \text{Equation 1}$$

(low to high)

A sampling condition for handling loops is given by:

$$\overline{gclk_{f0}} \wedge gclk_{f1\_early} \quad \text{Equation 2}$$

(low to high(early))

A glitch condition is given by:

$$\overline{gclk_{f0}} \wedge gclk_{f1\_early} \wedge \overline{gclk_{f1}} \quad \text{Equation 3}$$

$$(\text{low to low, but high in between–according to } f1_{early})$$

Figure 10:
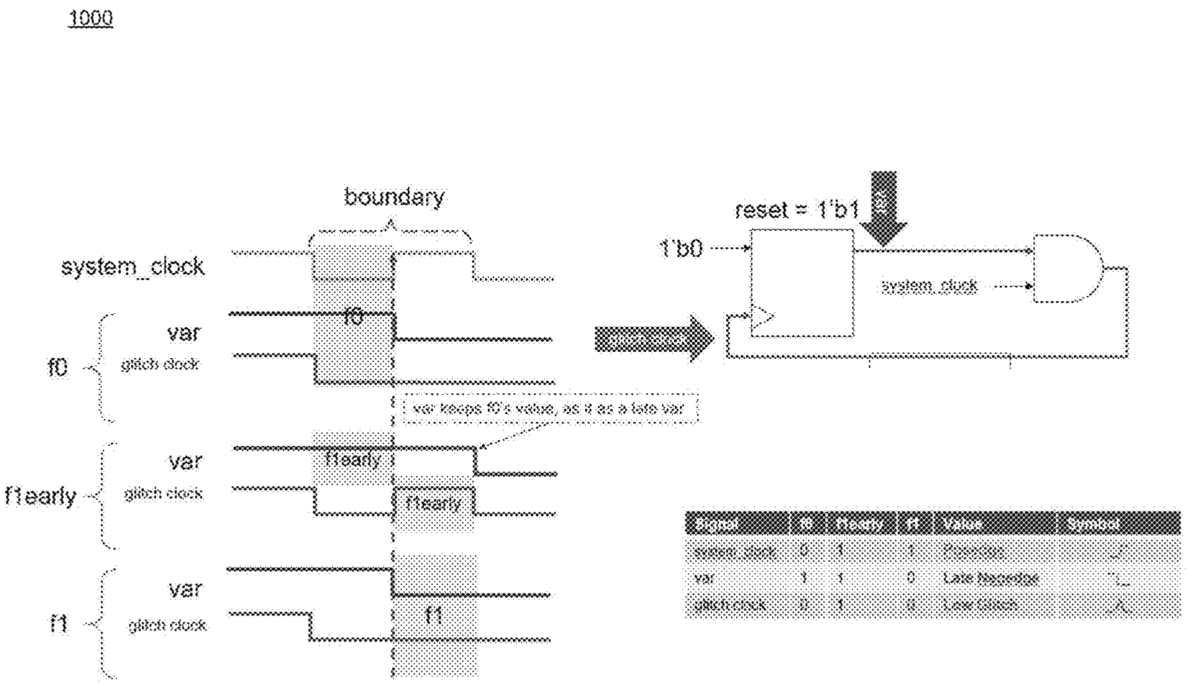
FIG. 10 is a diagram showing a timing diagram of a glitch simulation breakdown as well as glitch simulation RTL and a table showing glitch simulation values according to an embodiment of the present disclosure.

Referring now to FIG. 10, an example glitch simulation is provided. FIG. 10 depicts an example glitch simulation breakdown and timing diagram. Example glitch simulation values are provided in the table and glitch simulation RTL is also provided. This particular example shows the simulation and how the f0, f1 and f1_early may be determined. Based on the values determined by the glitch simulation, glitch debugging process 10 may proceed to identify relevant pieces of the logic that are points of interest for the user debug. Each of the items presented in FIG. 8 may be inferred or computed by structurally and functionally walking on the cone of influence of the glitch clocks, until reaching the original glitch flop. Visited signals along the way may be labeled as the glitch propagation path.

Figure 11:
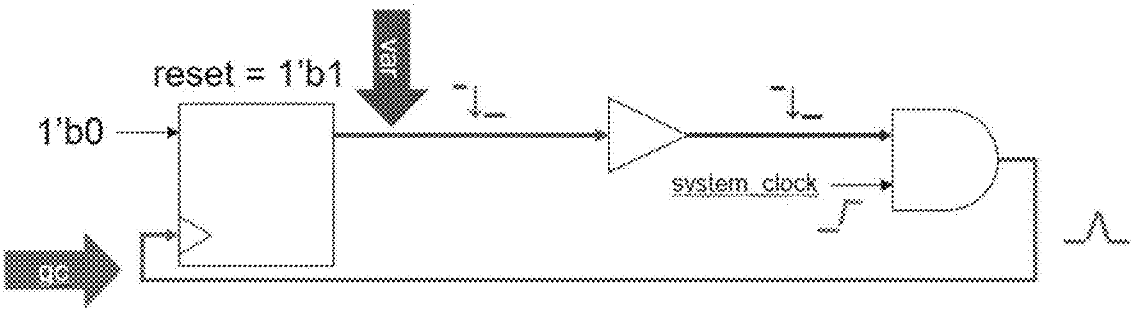
FIG. 11 is a diagram showing an example extracting the glitch propagation path according to an embodiment of the present disclosure.

Referring also to FIG. 11, an example for computing a glitch propagation path is provided. Glitch debugging process 10 may use one or more glitch simulation values to provide the glitch propagation path. In operation, process 10 may use the glitch clock as an initial starting point. The process may traverse backwards, visiting glitches and late values, for example, low glitch, high glitch, late-posedge, late-negedge. Visitation ends at the glitch variable. Visited signals in the glitch propagation path, including glitch var and gc are shown in FIG. 11.

Figure 12:
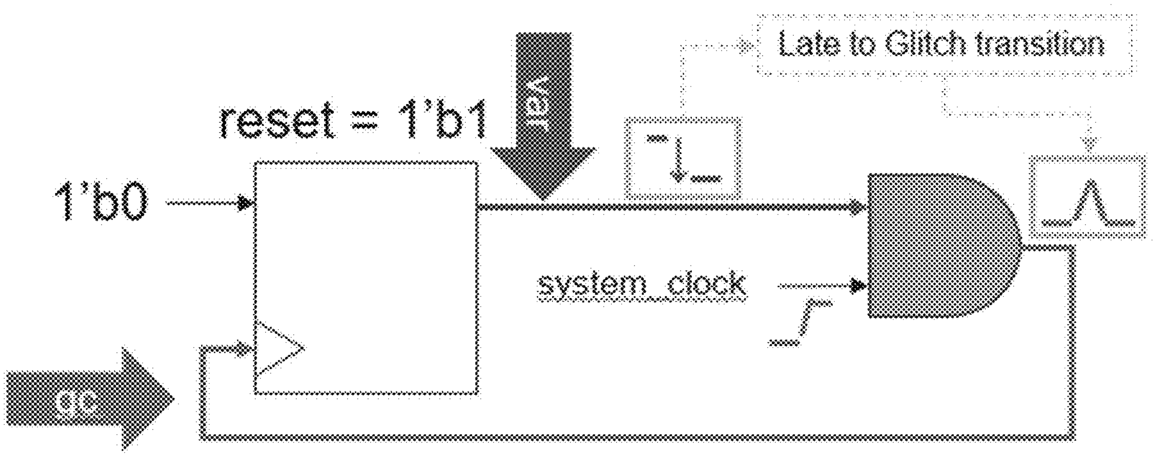
FIG. 12 is a diagram showing an example extracting the glitch source according to an embodiment of the present disclosure.

Referring also to FIG. 12, an example showing the extraction of the glitch source is provided. The glitch source may correspond to a gate where any of its inputs contains late-posedge or late-negedge. The output may contain low-glitch or high-glitch.

It will be apparent to those skilled in the art that various modifications and variations can be made in the embodiments of the present disclosure without departing from the spirit or scope of the invention. Thus, it is intended that embodiments of the present disclosure cover the modifications and variations of this invention provided they come within the scope of the appended claims and their equivalents.

What is claimed is:

1. A computer-implemented method for formal verification glitch debugging in an electronic design comprising:
- receiving, using a processor, the electronic design;
- performing a formal verification glitch analysis of the electronic design to determine if one or more glitches are present in a clock logic of the electronic design;
- if a glitch is identified, causing a generation of a graphical glitch debugger display;
- receiving an edit to the electronic design;
- re-performing the formal verification glitch analysis of the electronic design to determine whether a glitch is present.

2. The method of claim 1, wherein causing the generation of the graphical glitch debugger display includes automatically generating one or more labels, colors, or icons at the display.

3. The method of claim 1, wherein causing the generation of the graphical glitch debugger includes displaying a gate diagram showing a glitch path.

4. The method of claim 1, wherein causing the generation of the graphical glitch debugger includes displaying a cycle by cycle waveform.

5. The method of claim 1, wherein the formal verification glitch analysis includes an 8-value formal verification analysis on a target group of combinational loops.

6. The method of claim 2, wherein a different color is used to highlight a number of different logic elements associated with a glitch path.

7. The method claim 6, wherein the number of different logic elements include one or more of glitch, late edge, and main gate.

8. A non-transitory computer readable medium having stored thereon instructions, the instructions when executed by a processor resulting in one or more operations for formal verification glitch debugging, the operations comprising:
- receiving, using a processor, the electronic design;
- performing a formal verification glitch analysis of the electronic design to determine if one or more glitches are present in a clock logic of the electronic design; and
- if a glitch is identified, causing a generation of a graphical glitch debugger display, wherein causing a generation of a graphical glitch debugger display includes a gate diagram showing a glitch path corresponding to the identified glitch receiving an edit to the electronic design;
- and re-performing the formal verification glitch analysis of the electronic design to determine whether a glitch is present.

9. The non-transitory computer readable medium of claim 8, wherein causing the generation of the graphical glitch debugger display includes automatically generating one or more labels, colors, or icons at the display.

10. The non-transitory computer readable medium of claim 8, wherein causing the generation of the graphical glitch debugger includes displaying a cycle by cycle waveform.

11. The non-transitory computer readable medium of claim 8, wherein the formal verification glitch analysis includes an 8-value formal verification analysis on a target group of combinational loops.

12. The non-transitory computer readable medium of claim 9, wherein a different color is used to highlight a number of different logic elements associated with a glitch path.

13. The non-transitory computer readable medium claim 12, wherein the number of different logic elements include one or more of glitch, late edge, and main gate.

14. A system for electronic design synthesis, electronic design setup, and glitch signoff comprising:
- a graphical user interface; and
- at least one processor configured to receive, using a processor, the electronic design, the at least one processor further configured to perform a formal verification glitch analysis of the electronic design to determine if one or more glitches are present in a clock logic of the electronic design, if a glitch is identified, the at least one processor further configured to cause a generation of a graphical glitch debugger display via the graphical user interface, the at least one processor further configured to receive an edit to the electronic design at the graphical user interface, wherein the at least one processor is further configured to re-perform the formal verification glitch analysis of the electronic design to determine whether a glitch is present.

15. The system of claim 14, wherein causing the generation of the graphical glitch debugger display includes automatically generating one or more labels, colors, or icons at the display.

16. The system of claim 14, wherein causing the generation of the graphical glitch debugger includes displaying a gate diagram showing a glitch path.

17. The system of claim 14, wherein causing the generation of the graphical glitch debugger includes displaying a cycle by cycle waveform.

18. The system of claim 14, wherein the formal verification glitch analysis includes an 8-value formal verification analysis on a target group of combinational loops.

19. The system of claim 15, wherein a different color is used to highlight a number of different logic elements associated with a glitch path.

* * * * *